United States Patent
Foster et al.

(10) Patent No.: US 6,704,044 B1
(45) Date of Patent: Mar. 9, 2004

(54) COMPLETELY INTEGRATED BASEBALL CAP CAMERA

(75) Inventors: Ronald R Foster, Los Gatos, CA (US); Gregory David Gallinat, Sunnyvale, CA (US); Richard Alex Nedinsky, San Jose, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 541 days.

(21) Appl. No.: 09/593,250

(22) Filed: Jun. 13, 2000

(51) Int. Cl.[7] .............................. H04N 9/47; H04N 7/18
(52) U.S. Cl. ....................................... 348/157
(58) Field of Search ........................ 348/157, 14.01, 348/158, 143, 64, 164, 169, 373; H04N 9/47, 7/18

(56) References Cited

U.S. PATENT DOCUMENTS

| | | | | | |
|---|---|---|---|---|---|
| 4,605,956 A | * | 8/1986 | Cok | ............................ | 348/242 |
| 5,579,046 A | * | 11/1996 | Mitsuhashi et al. | ....... | 348/231.4 |
| 5,880,782 A | * | 3/1999 | Koyanagi et al. | ............ | 348/364 |
| 6,023,288 A | * | 2/2000 | Coombs et al. | ................ | 348/64 |
| 6,028,625 A | * | 2/2000 | Cannon | ........................ | 348/135 |
| 6,111,571 A | * | 8/2000 | Summers | ...................... | 345/756 |
| 6,151,066 A | * | 11/2000 | Ito | ................................ | 348/169 |
| 6,255,650 B1 | * | 7/2001 | Warner et al. | ............... | 250/330 |
| 6,292,213 B1 | * | 9/2001 | Jones | ............................ | 348/61 |
| 6,456,261 B1 | * | 9/2002 | Zhang | ............................ | 345/8 |
| 6,496,361 B2 | * | 12/2002 | Kim et al. | .................... | 361/683 |

* cited by examiner

*Primary Examiner*—Nhon Diep
(74) *Attorney, Agent, or Firm*—Perkins Coie LLP

(57) ABSTRACT

A camera unit is mountable to a cap. The camera unit includes a single-chip image sensor, such as a color complementary metal oxide semiconductor (CMOS) image sensor, and includes a mounting mechanism that is structured to allow the camera unit to be attached to an existing structure of the cap, such as to a brim of a baseball cap. The camera unit further includes a transmit unit to allow transmission of a signal representative of captured images and a receive unit to receive control signals to control parameters associated with the camera unit. The control signals can be sent from a remote unit, thereby allowing the remote unit to control parameters of the camera unit, such as exposure, gain, white balance, color saturation, brightness, or hue. The camera unit can be of a small size and weight, and can be completely integrated on a single-chip, thereby minimizing intrusiveness to the cap wearer.

21 Claims, 3 Drawing Sheets

COMPLETELY INTEGRATED BASEBALL CAP CAMERA

BACKGROUND OF THE INVENTION

1. Field of the Invention

The present invention relates generally to image sensors, and in particular, relates to a complementary metal oxide semiconductor (CMOS) image sensor forming part of a camera unit that can be mounted onto headgear, such as a baseball cap.

2. Background Information

Sports video information of real-time events is a major part of modern-day America. Camera operators who photograph a sporting event and its live action are removed from participating directly on the field. Allowing a camera operator to physically interject onto the actual field of play creates a potential for camera operator or player injury, and interferes with the normal play of the sporting event.

Current systems for capturing video and still images of sporting events typically include video cameras positioned in various locations within the sporting arena, with the camera operators capturing video and still images from around the periphery of the sporting event (e.g., outside of the actual playing field).

However, placement of these cameras outside of the actual playing field has certain disadvantages. For instance, in order to get the "best" views of particular instances in the game, multiple cameras need to be positioned along the periphery, so that the best angle or "shot" can be chosen from among the different cameras. This is cumbersome and expensive because of the extra equipment and set-up that are needed, and because of the high level of coordination required between camera operators, directors, technicians, etc.

Additionally, even though there may be multiple angles available from the cameras positioned around the periphery of the playing field, the "best" shot is sometimes simply not available. The camera with the best angle may be too far from the play, or spectators might obstruct the camera's view of the play, by players standing along the sideline, or by physical objects.

Furthermore, the cameras around the periphery of the playing field may be mounted on a fixed platform, and are therefore not portable to follow the players as they move up and down the field. If the cameras have to be mobile, then they are often carried on the shoulder of the camera operator walking along the sideline, or they are mounted on a moving stand or vehicle that moves along the sideline. Because of the weight and bulkiness of these conventional cameras and of their mounts/platforms, moving a camera to follow the action is difficult to perform with satisfactorily high quality results.

Accordingly, there is a need to improve on the capturing of real-time video or still images of sporting events.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of an integrated baseball cap camera and associated baseball cap camera system are described in detail herein. In the following description, numerous specific details are provided, such as the components of a baseball cap in FIGS. 1–3, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As discussed above, existing camera systems suffer from the disadvantages of being bulky and inconvenient to position for best camera angles. An embodiment of the invention addresses these disadvantages by physically attaching an unobtrusive camera unit of sufficiently small size and weight that is capable of broadcasting real-time video or still image data from a cap. In one embodiment, the camera unit includes a small complementary metal oxide semiconductor (CMOS) camera sensor mounted directly on the front of a cap, such as a baseball cap. Embodiments of the invention provide certain advantages, including minimizing size and weight, while still allowing video or still image capture to occur directly from a point of view that is close to that of the actual viewpoint of the wearer.

For simplicity of explanation, an embodiment of the invention will be described herein in the context of a camera unit mounted on a baseball cap. It is to be appreciated, however, that other embodiments of the invention may provide camera units mounted on other types of headgear/headwear that are not necessarily used for baseball and/or during sports. Examples include caps worn by umpires/referees, or caps worn for everyday use or for industrial settings where heads need to be covered or where a brim is needed to shield the wearer's eyes from bright light. Other examples include ski caps, bonnets, hats, headbands, police/military caps, etc. Accordingly, the invention is not necessarily limited by the specific type of headgear utilized.

Figure 1:
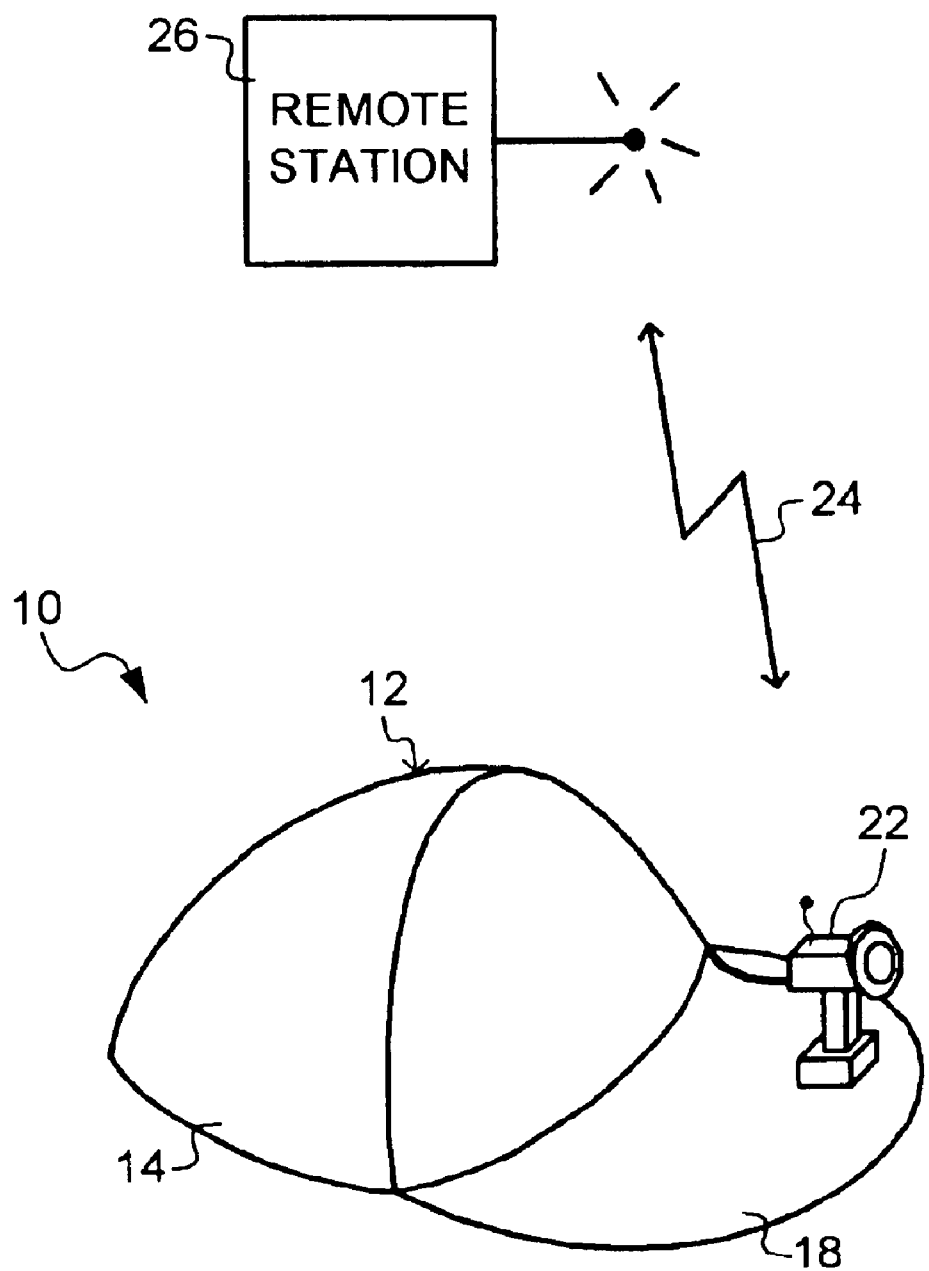
FIG. 1 shows a baseball cap camera system according to an embodiment of the invention that includes a camera unit mounted on a baseball cap.

Referring first to FIG. 1, shown generally at 10 is a baseball cap camera system according to an embodiment of the invention. The system 10 includes a cap 12, which is in the general shape of a "baseball" cap in the illustrated embodiment. The cap 12 has a main body 14 to cover the head of the wearer. The cap 12 has a brim 18, typically made of a more rigid material than the main body 14. The brim 18 functions to shield the face and/or eyes of the wearer from bright light or airborne particles, thereby providing the wearer with an unobstructed field of view (FOV). The brim 18 is mounted to the main body 14 by being sewn onto the main body 14.

In an embodiment of the invention, a completely integrated camera unit 22 (or "module") is mounted onto the cap 12. The camera unit 22 is of small size and weight, and can be mounted on an upper surface of the brim 18 in front of the main body 14. The camera unit 22 can be positioned towards the side portion of an upper surface of the brim 18 or it may be positioned at a substantially central portion of the upper surface of the brim 18. These positions allow the camera unit 22 to have substantially the same FOV as the wearer of the cap 12. The camera unit 22 can be retrofitted onto existing commercially available caps, or caps can be manufactured that include the camera unit 22. Specific components of the camera unit 22 are described later below with reference to FIGS. 24.

The camera unit 22 can be provided with a wireless communication link 24 to a remote station 26. The communication link 24 can comprise a radio frequency signal, infrared signal, microwave signal, optical signal, or other suitable wireless signal. The communication link 24 allows video and/or still images captured by the camera unit 22 to be transmitted to the remote station 26 for subsequent processing or broadcast. The communication link 24 also allows the remote station 26 to control various settings of the camera unit 22, as described below. The remote unit 26 can be any type of component or system remotely located from the camera unit 22, and can include, for example, a hand-held device positioned along the sideline of a playing field, a media center located in a vehicle in a parking lot or in a press box, a stationary transceiver positioned at a vantage point in a stadium/arena, etc.

Figure 2:
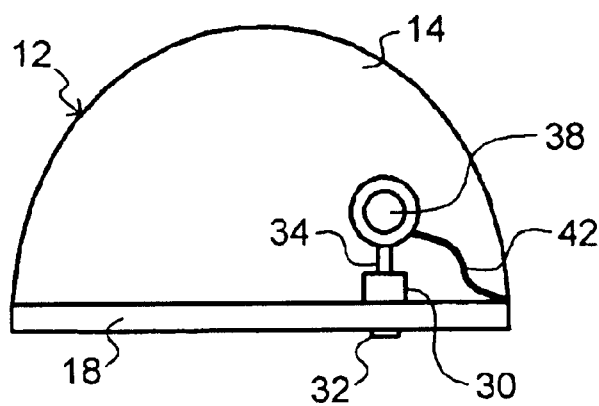
FIG. 2 shows a front view of an embodiment of the cap-mounted camera unit of FIG. 1.
Figure 3:
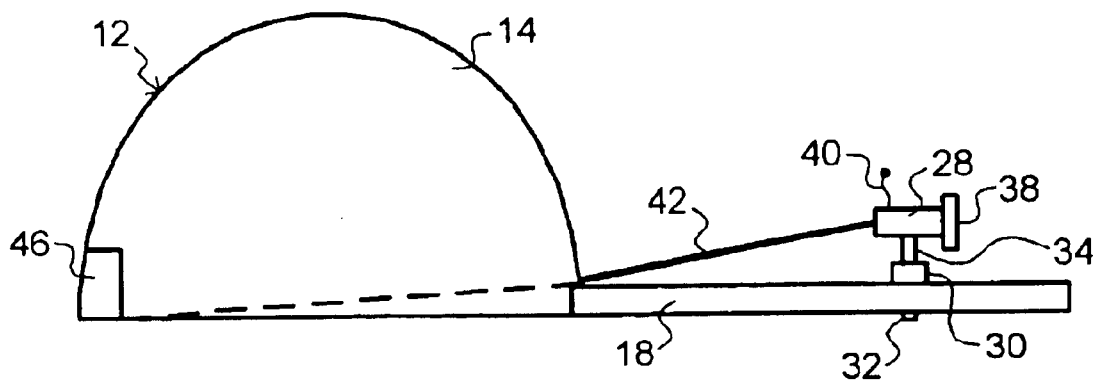
FIG. 3 is a side view illustrating a mounting method for the baseball cap camera unit of FIGS. 1–2.

FIGS. 2 and 3 show front and side views, respectively, of the camera unit 22 mounted on the cap 12. The camera unit 22 includes a housing 28 that houses various electronic and nonelectronic components of the camera unit 22. The housing 28 can provide protective covering for electronic components of the camera unit 22. The camera unit 22 can be attached to the brim 18 by a mounting mechanism 30 that can include a bolt, rivet, threaded screw, or other similar adjusting unit 32 drilled into the brim 18. One end of the adjusting unit 32 is coupled to the housing 28, and can include, at that end, a ball and socket assembly 34 to allow the position/angle of the camera unit 22 to be changed, thereby providing the camera unit 22 with the capability of changing its position (e.g., its "tilt" or rotational orientation) in order to optimize its FOV.

The camera unit 22 includes a lens unit 38, behind which components such as color filters, an image sensor, associated electronic components, etc. can be located. An antenna unit 40 allows transmission/reception along the communication link 24. In one embodiment, the antenna unit 40 is a free standing segment of metal, while in another embodiment the antenna unit 40 can include a metal lead that is attached along the interior or exterior surface of the cap 12, or that is made integral with the main body 14. In yet another embodiment, electronic wiring 42 (e.g., wiring used for power connections) can function as an antenna.

The camera unit 22 includes a power supply/unit that, in one embodiment, can use miniature-sized batteries of sufficient power that are mounted within or adjacent to the housing 28. In another embodiment, a larger-sized battery 46 can be used by suitably connecting the battery 46 to the wiring 38. The wiring 38 can be attached along the interior or exterior surface of the main body 14, with the battery 46 being attached to the rear exterior surface of the main body 14, or attached to some other convenient location on the wearer's body, such as on a utility belt.

Figure 4:
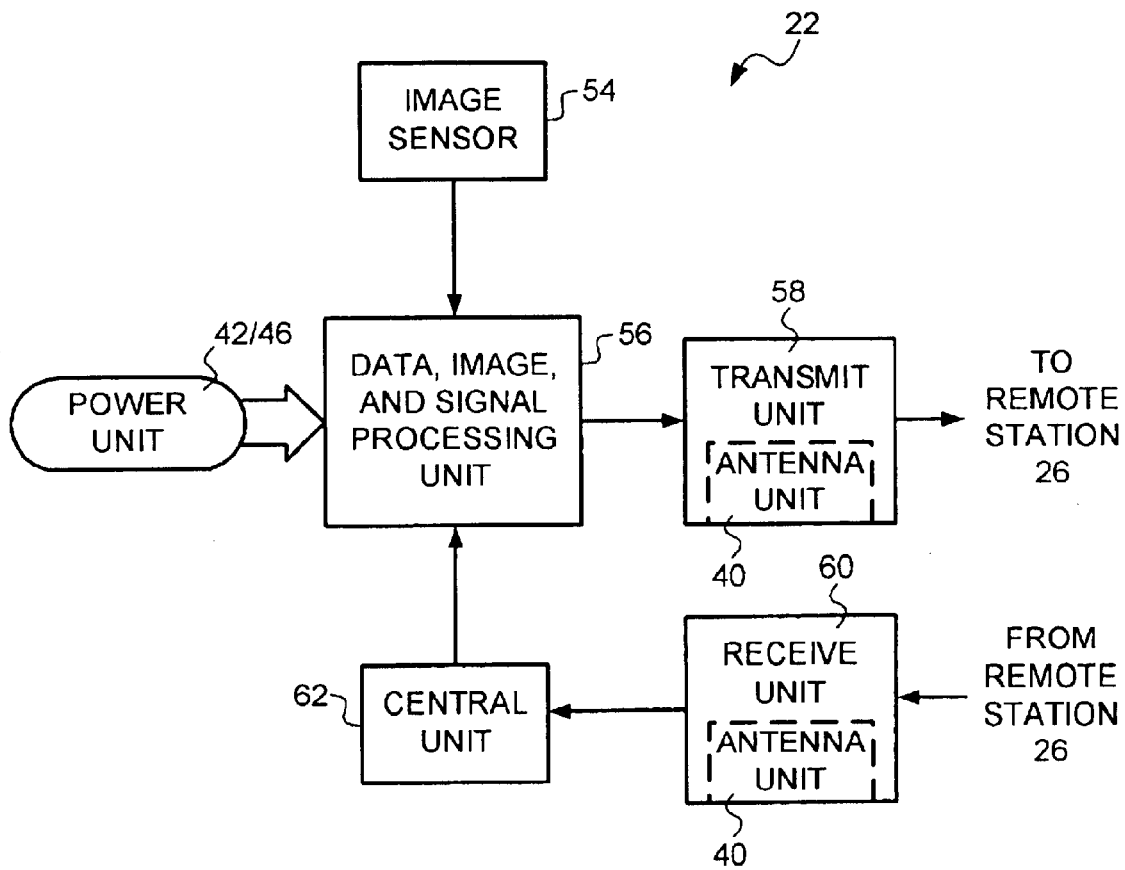
FIG. 4 is a block diagram showing components of the baseball cap camera unit of FIGS. 1–3.

FIG. 4 is a block diagram showing some of the components of the camera unit 22, symbolically shown as being provided with power via a power unit that can comprise the wiring 38 and battery 46, or from some other power supply. In one embodiment, the components of the camera unit 22 can be contained on a single chip. The camera unit 22 includes an image sensor 54, which can be a single-chip color CMOS image sensor, such as those manufactured by Omnivision Technologies, Inc. of Sunnyvale, Calif., the assignee of the present invention. Such CMOS image sensors provide advantages over image sensors that use charge coupled devices (CCDs), in that CCD image sensors have large sizes and power consumption that are not well-suited for headgear-mounted camera units. The image sensor 54 includes a two-dimensional sensing array comprising a plurality of pixels (not shown), and associated electronics.

The image sensor 54 can include or can be coupled to a data, image, and signal processing unit 56. The processing unit 56 can comprise timing circuitry, analog-to-digital converters, calibration circuitry, control circuitry, image processing circuitry (such as chromaticity and luminance signal processing circuitry), etc. In one embodiment, the processing unit 56 can include a video timing generator to generate SYNC and BLANK signals (useable for vertical blanking intervals) for a National Television Standards Committee (NTSC) video format. The SYNC and BLANK signals, along with processed image signals, can then be directed to a NTSC encoder that is controllable by hue and saturation controls.

Other circuitry to generate composite video can be used. For example, circuitry of the camera unit 22 can be provided to generate Phase Alternating Line (PAL) or Systeme Electronique Couleur Avec Memoire (SECAM) video formats or to generate data in digital format. For the sake of simplicity, specific details of the image sensor 54 and of the processing unit 56 are not provided herein because such details would be known by those skilled in the art based on the discussion provided herein. Examples of suitable devices that can be used for the image sensor 54 and the processing unit 56 are disclosed in U.S. Pat. Nos. 5,901,257 and 6,035,077, assigned to Omnivision Technologies and incorporated herein by reference.

Images captured by the camera unit 22 via the image sensor 54 and subsequently processed by the processing unit 56, are provided as signals to a transmit unit 58. The transmit unit 58 can include the antenna unit 40 and other components known in the art (e.g., a modulator) to transmit signals representative of these images to the remote station 26, via the communication link 24. After receiving these signals transmitted from the transmit unit 58, the remote station 26 can perform further processing (e.g., demodulation, filtering, enhancement, etc.), in order to re-transmit the signal or to save the signal in a storage medium (e.g., a video cassette, disk, compact disk, digital video disk, etc.).

The remote station 26 can further remotely control settings of the camera unit 22, via control signals sent along the communication link 24. Such control signals can include, for example, signals to turn the camera unit 22 on/off and signals to change parameters of the camera unit 22, such as exposure, gain, white balance, color saturation, brightness, hue, etc. These control signals are sent from the remote station 26 and received by a receive unit 60, which can include the antenna unit 40 and other components to process the received signals (e.g., a demodulator). The receive unit 60 can subsequently provide the control signals to a control unit 62 (or directly to the processing unit 56), so that the control signals can initiate change(s) in parameters of the camera unit 22. In one embodiment, the transmit unit 58 and the receive unit 60 can be separate components, while in another embodiment, they can form part of a single transceiver unit.

In conclusion, an embodiment of the invention provides the camera unit 22 that utilizes existing physical characteristics of the cap 12, thereby dramatically reducing the amount of changes that need to be done to the cap 12 for mounting. Because of the small size of the camera unit 22 and the manner in which it is mounted, the possibility of causing injury to the wearer or to other players so is reduced. In one embodiment, the camera unit 22 uses the existing brim 18 for the mounting foundation. The mounting mechanism 30 includes a ball and socket assembly 34 to allow the camera unit 22 to be adjusted for each individual wearer and to the variances in physical characteristics of individual caps 12. The camera unit 22 comprises a fully integrated camera module of such small size and weight that minimizes intrusiveness to the wearer to the point that camera use is made feasible for modern-day sporting activities.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while an embodiment has been described herein as including most or all of the components shown in FIG. 4 on a single chip, it is possible to provide other embodiments where such components need not be located on a single chip. In these other embodiments, such components can instead be separate elements coupled together and mounted on the housing 28.

In other modifications, the camera unit 22 can be mounted on caps or hats other than baseball caps. In these other types of headgear, the camera unit 22 can also be mounted on bills/brims, or on other suitable structures, including on the exterior surface of the hats/caps themselves. Furthermore, while an embodiment has been described herein as having the camera unit 22 mounted onto the cap 12, it is possible to provide other embodiments where the camera unit 22 is made an integral part of the cap 12. Because of the small size of the components of the camera unit 22, the camera unit 22 (or at least a portion thereof easily can be made integral with the structure of the main body 14 at the front region of the cap 12. This may be done, for example, during the manufacturing or assembly process for the cap 12.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   using a cap-mounted camera unit to capture images, the camera unit having a single-chip image sensor;
   transmitting, from the cap-mounted camera unit to a remote station, a signal representative of the captured images; and
   transmitting a control signal from the remote station to the cap-mounted camera unit to control a parameter associated with the cap-mounted camera unit, wherein the parameter associated with the cap-mounted camera unit comprises one of an exposure, gain, white balance, color saturation, brightness, or hue.

2. The method of claim 1 wherein the signals are transmitted along a wireless radio frequency communication link.

3. The method of claim 1, further comprising adjusting a field of view of the cap-mounted camera unit by using an adjusting unit attached to the cap-mounted camera unit to change an orientation of the cap-mounted camera unit.

4. A method, comprising:
   providing a camera unit mountable on a cap, the camera unit having a single-chip image sensor;
   providing the camera unit with circuitry to allow transmission of a signal representative of captured images; and
   providing the camera with circuitry to allow reception of control signals to control parameters associated with the camera unit; wherein the parameter associated with the cap-mounted camera unit comprises one of an exposure, gain, white balance, color saturation, brightness, or hue.

5. The method of claim 4 wherein the image sensor comprises a color complementary metal oxide semiconductor (CMOS) image sensor having a processing unit to allow processing of images.

6. The method of claim 5 wherein the processing unit includes components to provide a National Television Standards Committee (NTSC), Phase Alternating Line (PAL), or Systeme Electronique Couleur Avec Memoire (SECAM) video format derived from the captured images.

7. The method of claim 5 wherein the processing unit includes components to provide a digital data derived from the captured images.

8. The method of claim 4 wherein the cap comprises a baseball cap having a brim, the method further comprising:
   placing components of the camera unit in a housing; and
   affixing a mounting mechanism to the housing, the mounting mechanism including an adjusting unit structured to allow the housing to be mounted to the brim and to allow a change in an orientation of the housing.

9. The method of claim 8, further comprising providing the adjusting unit with a ball and socket assembly coupled to the housing to allow rotational change of the orientation of the housing to change a field of view of the camera unit.

10. An apparatus, comprising:
    a camera unit mountable to a cap, the camera unit having a single-chip image sensor and including a mounting mechanism structured to allow the camera unit to be attached to an existing structure of the cap, the camera unit further including a transmit unit to allow transmission of a signal representative of captured images and a receive unit to receive control signals to control parameters associated with the camera unit, wherein the parameter associated with the cap-mounted camera unit comprises one of an exposure, gain, white balance, color saturation, brightness, or hue.

11. The apparatus of claim 10 wherein the camera unit further comprises:
    an image sensor array to capture images; and
    a processing unit coupled to the image sensor array to use the parameters to process the images and to provide the signal representative of the captured images to the transmit unit, wherein the processing unit is responsive to the control signals change the parameters.

12. The apparatus of claim 11 wherein the camera unit further comprises a control unit coupled to receive the control signals from the receive unit and coupled to the processing unit to control operation of the processing unit based on the control signals.

13. The apparatus of claim 10 wherein the cap comprises a baseball cap and wherein the existing structure comprises a brim, the camera unit further comprising a housing having the mounting mechanism affixed thereon, the mounting mechanism including a threaded component affixed to the brim to allow the housing to be mounted to the brim.

14. The apparatus of claim 10 wherein the mounting mechanism further comprises an adjusting unit attached to a housing of the camera unit, the adjusting unit having a ball and socket assembly to allow change of a field of view of the camera unit by changing a rotational position of the housing.

15. The apparatus of claim 10 wherein the image sensor comprises a color complementary metal oxide (CMOS) image sensor.

16. A system, comprising:

a cap;

a camera unit mounted to the cap, the camera unit having a single-chip image sensor and including a mounting mechanism structured to allow the camera unit to be attached to an existing structure of the cap, the camera unit further including a transmit unit to allow transmission of a signal representative of captured images and a receive unit to receive control signals to control parameters associated with the camera unit, wherein the parameter associated with the cap-mounted camera unit comprises one of an exposure, gain, white balance, color saturation, brightness, or hue; and a remote unit to receive the signal representative of captured images from the transmit unit and to transmit the control signals to the receive unit to externally control the camera unit.

17. The system of claim 16 wherein the camera unit further comprises:

an image sensor array to capture images, and a processing unit coupled to the image sensor array to use the parameters to process the images and to provide the signal representative of the captured images to the transmit unit, wherein the processing unit is responsive to the control signals change the parameters.

18. The system of claim 16 wherein the camera unit further comprises a control unit coupled to receive the control signals from the receive unit and coupled to the processing unit to control operation of the processing unit based on the control signals.

19. The system of claim 16 wherein the signal representative of captured images and the control signals comprise radio frequency signals.

20. The system of claim 16 wherein mounting mechanism further comprises an adjusting unit attached to a housing of the camera unit, the adjusting unit being structured to allow change a field of view of the camera unit by changing a rotational position of the housing.

21. The system of claim 16 wherein the cap comprises a baseball cap and wherein the existing structure comprises a brim, the camera unit further comprising a housing having the mounting mechanism affixed thereon, the mounting mechanism including an elongated component structured to allow the housing to be mounted to the brim.

* * * * *